United States Patent
Hashimoto et al.

(10) Patent No.: US 6,875,261 B2
(45) Date of Patent: Apr. 5, 2005

(54) UNBURNED COLOR PENCIL LEAD

(75) Inventors: Yuka Hashimoto, Izumisano (JP); Hiroki Nishino, Osaka (JP)

(73) Assignee: Sakura Color Products Corporation, Osaka (JP)

( * ) Notice: Subject to any disclaimer, the term of this patent is extended or adjusted under 35 U.S.C. 154(b) by 0 days.

(21) Appl. No.: 10/312,226

(22) PCT Filed: Jun. 15, 2001

(86) PCT No.: PCT/JP01/05237

§ 371 (c)(1), (2), (4) Date: Aug. 4, 2003

(87) PCT Pub. No.: WO01/98417

PCT Pub. Date: Dec. 27, 2001

(65) Prior Publication Data

US 2004/0016366 A1 Jan. 29, 2004

(30) Foreign Application Priority Data

Jun. 23, 2000 (JP) ........................................ 2000-188893
Mar. 9, 2001 (JP) ......................................... 2001-66572

(51) Int. Cl.⁷ .............................................. C09D 13/00
(52) U.S. Cl. .................................. 106/31.11; 106/31.12
(58) Field of Search ........................... 106/31.11, 31.12

(56) References Cited

U.S. PATENT DOCUMENTS

| 5,595,700 | A | | 1/1997 | Kitazawa .................. 106/31.12 |
| 5,688,493 | A | * | 11/1997 | Sugawara et al. ............. 424/61 |
| 6,395,076 | B1 | * | 5/2002 | Hashimoto ............... 106/31.11 |
| 6,458,390 | B1 | * | 10/2002 | Manelski et al. ........... 424/617 |
| 6,511,533 | B2 | * | 1/2003 | Hashimoto ............... 106/31.11 |

FOREIGN PATENT DOCUMENTS

| JP | 51-153023 | 12/1976 |
| JP | 59-120668 | 7/1984 |
| JP | 6-157974 | 6/1994 |
| WO | WO 99/61537 | 2/1999 |

* cited by examiner

Primary Examiner—Mark L. Bell
Assistant Examiner—Veronica F. Faison
(74) Attorney, Agent, or Firm—Merchant & Gould P.C.

(57) ABSTRACT

For the improvement of moldability of a lead and bending strength of a lead, a non-calcined lead of a colored pencil contains a colorant, a binder, a body filler, waxes and/or oils, and a hydrophilic surfactant, and as a hydrophilic surfactant, a polyethylene additive of oils is contained. For the improvement of water resistance, a non-calcined lead of a colored pencil contains a colorant, a binder, a body filler, waxes and/or oils, and a hydrophilic surfactant, and further, a water repellent substance. Further, as a non-calcined lead of a colored pencil with easy quality control process, it contains plate type alumina and/or plate type alumina hydrate.

13 Claims, No Drawings

UNBURNED COLOR PENCIL LEAD

FIELD OF THE INVENTION

The present invention relates to a non-calcined lead of a colored pencil. In more detail, the present invention relates to a non-calcined lead of a colored pencil which has improved bending strength of a lead in particular, as well as having improved moldability and a tinting strength of a lead at the time of writing. In particular, the present invention relates to a non-calcined lead of a colored pencil which can be erased its written mark with an eraser. In addition, the present invention relates to a non-calcined lead of a colored pencil which has improved water resistance, with easy quality control operations, and maintains excellent safety since it no longer contains asbestos as in conventional talc.

DESCRIPTION OF THE PRIOR ART

A conventional non-calcined lead of a colored pencil contains a water-soluble resin which is a binder, and waxes and/or oils at the same time. Therefore, a problem of bad moldability occurs since a water-soluble resin which is a binder, and waxes and/or oils are hard to be mixed uniformly when mixed. In addition, since waxes and/or oils inhibit the binding force of a water soluble resin during the process of molding a lead, another problem of low bending strength occurs when used as a lead of a colored pencil. In particular, in order to obtain a colored pencil which can be erased its written mark with an eraser, since it is necessary to use oily substances in liquids at an ordinary temperature as waxes and/or oils, these problems occur more remarkably compared with when solids at an ordinary temperature are used.

Regarding bending strength, conventionally, a non-calcined lead of a colored pencil mixing a sorbitan fatty acid ester surfactant has been proposed in order to increase tinting amount without lowering bending strength of a lead (Patent Unexamined Publication SHO 51-153023). Further, a non-calcined lead of a colored pencil mixing a surfactant including sorbitan fatty acid ester and polyoxyethylene sorbitan fatty acid ester has been proposed in order to improve moldability and bending strength of a lead (Patent Unexamined Publication 2000-7976).

However, when oily substances in liquids at an ordinary temperature as waxes and/or oils are mixed in a non-calcined lead of a colored pencil to make a written mark erasable with an eraser, the improvement of moldabilty and bending strength of a lead is not always satisfactory with these surfactants.

Further, a non-calcined lead of a colored pencil which contains such surfactants as a hydrophilic surfactant does not always have a written mark with satisfactory water resistance since lowering of strength(moisture resistance) of a lead and lowering of water resistance of a written mark are observed under high moisture by containing a hydrophilic surfactant. Therefore, in many cases, a non-calcined lead of a colored pencil which contains a hydrophilic surfactant is not suitable for the purpose which requires water resistance.

On the other hand, in a non-calcined lead of a colored pencil, various kinds of body fillers are used depending on their properties. In particular, a non-calcined lead of a colored pencil which contains talc as a body filler can improve bending strength since crystals of scaly talc are oriented in one direction, and further, a non-calcined lead of a colored pencil which contains talc is capable of obtaining a property as a non-calcined lead of a colored pencil having good writing performance due to easiness of wearing and of lubricity, which are caused by talc.

In producing a non-calcined lead of a colored pencil which contains talc, operations of selecting talc which does not include asbestos and controlling its quality are conducted usually. The reason is that since talc is a natural mineral, it sometimes contains asbestos which are pointed out recently that it may have a bad effect on a human body depending on its production area where it is mined.

Since operations of quality control are complicated, if possible, it is desirable to use a body filler which has a stabilized quality and is excellent in safety in order to make operations easier. It is also necessary for a non-calcined lead of a colored pencil using a body filler that does not require such operations to have physical properties including the equivalent tinting amount (tinting strength), good bending strength, good writing performance, and the like.

In other words, conventionally, there have been lying some problems in providing a non-calcined lead of a colored pencil with good moldability and bending strength of a lead as well as improved water resistance even when oily substances that are in liquids at an ordinary temperature are mixed as waxes and/or oils. Needless to say, in the case where waxes and/or oils that are in solids at an ordinary temperature are mixed, the situation is worse. In addition, there has been lying another problem of providing a non-calcined lead of a colored pencil without lowering the properties as a drawing tool including bending strength, writing performance, and the like, without the need of confirming the absence of asbestos, and further, with good safety compared with a non-calcined lead of a colored pencil which contains conventional talc as a body filler.

DISCLOSURE OF THE INVENTION

In the present invention, a non-calcined lead of a colored pencil which contains a colorant, a binder, a body filler, waxes and/or oils, and a hydrophilic surfactant and which contains polyoxyethylene additives of oils as above hydrophilic surfactant is adopted. In particular, as above hydrophilic surfactant, polyoxyethylene additives of oils that are at least either of polyoxyethylene castor oil or polyoxyethylene hardened castor oil are preferable. The non-calcined lead of a colored pencil of the present invention containing polyoxyethylene additive of oils as a hydrophilic surfactant has good moldability and bending strength of a lead when waxes and/or oils are contained, in particular, even when oily substances in liquids at an ordinary temperature is contained as waxes and/or oils.

Further, when a non-calcined lead of a colored pencil which contains a colorant, a binder, a body filler, waxes and/or oils, and a hydrophilic surfactant is so made as to contain a water repellent substance, strength of a lead under high moisture and water resistant property of a written mark can be improved.

Although the most preferable examples of a non-calcined lead of a colored pencil of the present invention which further contains a water repellent substance are not specifically limited, it is the non-calcined lead of a colored pencil which contains a colorant, a binder, a body filler, waxes and/or oils, and a hydrophilic surfactant and which contains a polyoxyethylene additive of oils as above hydrophilic surfactant and which contains a paraffin wax emulsion of an O/W emulsion which does not contain a surfactant as above water repellent substance is preferable.

In addition, by using plate alumina and/or plate alumina hydrate instead of using talc as a raw material, a non-calcined lead of a colored pencil which contains plate alumina and/or plate alumina hydrate shows satisfactory bending strength like a conventional non-calcined lead of a colored pencil containing talc due to the property of plate alumina and/or plate alumina hydrate of being oriented in one direction in a molding. In addition, in a non-calcined lead of a colored pencil which contains plate alumina and/or plate alumina hydrate, quality control operations that are some of the processes in producing a non-calcined lead of a colored pencil are easily conducted since the operations of confirming the absence of asbestos in a body filler is not required. Further, a non-calcined lead of a colored pencil which contains plate alumina and/or plate alumina hydrate is excellent in safety since there is no risk of containing asbestos unlike in the case of using conventional talc.

DESCRIPTION OF THE PREFERRED EMBODIMENT

A non-calcined lead of a colored pencil of the present invention contains a colorant, a binder, a body filler, waxes and/or oils, and a hydrophilic surfactant, and a polyoxyethylene additive of oils is contained as a hydrophilic surfactant.

(Hydrophilic Surfactant)

As hydrophilic surfactants in the present invention, known surfactants may be used, however, such surfactants are preferable as not to inhibit coloring (brightness) of colored pencils. As hydrophilic surfactants, when good moldability and bending strength of a lead are required, a polyoxyethylene additive of oils is preferable. Known hydrophilic surfactants can be used in combinations of two or more of them. Further, in order to realize better compatibility between a binder contained and waxes and/or oils in the present invention, above hydrophilic surfactants can be used with oleophilic surfactants together.

Oils in polyoxyethylene additives of above oils are ester of fatty acid and glycerin, however, as oils cited herein, both oils can be used regardless of natural or synthetic. Examples of plant based natural oils include cotton seed oil, palm oil, castor oil, olive oil, soybean oil, safflower oil, jojoba oil, sunflower oil, and the like. Examples of plant based natural oils also include hardened oils of the above. Examples of animal based natural oils include beef tallow, whale oil, fish oil, and the like. Examples of animal based natural oils also include hardened oils of the above.

However, among polyoxyethylene additives of these oils, polyoxyethylene castor oil or polyoxyethylene hardened castor oil are preferable. Therefore, as a preferred embodiment of the present invention, it is important to prepare a non-calcined lead of a colored pencil which contains at least either polyoxyethylene castor oil or polyoxyethylene hardened castor oil. For information, it is most suitable to use polyoxyethylene castor oil whose number of additional moles of ethylene oxide chain, or n, is 36 mol (H.L.B. value: 10.0) as polyoxyethylene castor oil or polyoxyethylene hardened castor oil in order to facilitate uniform mixture of water soluble resin which is a binder contained in a non-calcined lead of a colored pencil and waxes and/or oils.

Polyoxyethylene additives of oils as mentioned above, in particular, polyoxyethylene castor oil or polyoxyethylene hardened castor oil is contained in 0.1 to 10.0% by weight, and preferably 2.5 to 3.5% by weight with respect to the total amount of the raw material composition (in solids). When the above hydrophilic surfactant is contained in less than 0.1% by weight, the content is so little that molding of a lead is difficult and even when molding is made, bending strength of said lead is low, and practicality deteriorates in the case of a non-calcined lead of a colored pencil containing waxes and/or oils in liquids at an ordinary temperature. On the other hand, when the above hydrophilic surfactant is contained greater than 10.0% by weight, water resistance deteriorates.

(Binder)

As binders used in the present invention, any known binders can be used. However, binders with strength and rigidity are desirable. Examples include sodium carboxy methylcellulose (CMC sodium), ammonium carboxy methylcellulose (CMC ammonium), methylcellulose, hydroxy ethylcellulose, nitrocellulose, polyvinyl alcohol, Arabic gum, bentonite, and the like, and other known water soluble or water insoluble polymeric compound can be used regardless of whether they are natural or synthetic. These can be used alone or in combinations. Preferably, it is desirable to use known water soluble resins and known clay minerals. In addition, they can be used as a binder solution by adding solvent like water or the like. A binder is contained in 2 to 15% by weight with respect to the total amount of the raw material composition (in solids), and preferably is contained in 3 to 10% by weight. When the a binder is contained greater than 15% by weight with respect to the total amount of the raw material composition (in solids), writing performance lowers, wearing is hard to occur, and practicality lowers. On the other hand, when a binder is contained in less than 2% by weight with respect to the total amount of the raw material composition (in solids), molding of a lead becomes difficult and strength as a pencil lead is hard to get.

(Waxes and/or Oils)

As waxes and/or oils used in the present invention, known waxes and oils can be used regardless of whether they are in solids or in liquids in a state at an ordinary temperature so long as they do not inhibit coloring (brightness) by a colorant. Examples include a liquid paraffin, silicone oil, a paraffin wax, a microcrystalline wax, southall wax, a ketonewax, vaseline, hardened beef tallow, a beeswax, a Japan wax, α-olefin oligomer, whale oil, liquefied lanolin, castor oil, olive oil, epoxydized soybean oil, squalene, and the like. Waxes and/or oils can be used alone or in combinations of two or more of them regardless of whether they are synthetic or natural.

In particular, when a non-calcined lead of a colored pencil is so produced that the written mark can be erased with an eraser, it is preferable to use waxes and/or oils in liquids at an ordinary temperature as waxes and/or oils. When oily substances in liquids at an ordinary temperature are used as waxes and/or oils, the above hydrophilic surfactant makes oily substances which are in liquids at an ordinary temperature present without inhibiting general force of a binder. As a result, a written mark adhered to a paper surface is formed as an agglomerate in which a colorant particle and a body filler particle covered with a binder accompany oily substances which are in liquids at an ordinary temperature, thereby realizing a non-calcined lead of a colored pencil in which the written mark can be erased with an eraser.

The above waxes and/or oils are mixed in order to provide tinting strength and coloring (brightness) and the waxes and/or oils are contained in 1 to 20% by weight with respect to the total amount of the raw material composition (in solids), and preferably, 3 to 10% by weight. When the content of waxes and/or oils is less than 1% by weight, writing performance and tinting strength lower, and when the content exceeds 20% by weight, strength as a pencil lead becomes hard to obtain.

For information, due to the producing process, in mixing the above waxes and/or oils, they may be mixed as an O/W emulsion. A surfactant prepared as an O/W emulsion is not specifically limited. When the above waxes and/or oils are not prepared as an O/W emulsion, it is preferable that the above hydrophilic surfactant and the above waxes and/or oils are mixed beforehand, followed by mixing this mixture.

(Colorant)

A colorant used in the present invention is not specifically used, and both inorganic pigment and organic pigment which have tinting effect and beautiful coloring (brightness) and which are usually used can be used alone or in combinations with two or more of them. In addition to fluorescent pigment, pearlescent pigment, metal powder pigment, scaly pigment including glass flake pigment, and the like can be used. The content thereof is 0.1 to 20% by weight with respect to the total amount of the raw material composition (in solids), and preferably 1 to 15% by weight. When the above content exceeds 20% by weight with respect to the total amount of the raw material composition (in solids), writing performance lowers and strength as a pencil lead is hard to obtain. On the other hand, when the above content is less than 1% by weight with respect to the total amount of the raw material composition (in solids), in particular, less than 0.1% by weight, coloring(brightness) is not satisfactory.

(Water Repellent Substance)

Further, when a non-calcined lead of a colored pencil of the present invention is used for the usage requiring water resistance in a written mark, it is preferable to further contain water repellent substances. By containing water repellent substances in a non-calcined lead of a colored pencil, moisture resistance (strength of moisture resistance) of a lead and water resistance of a written mark can be obtained even for a non-calcined lead of a colored pencil with a hydrophilic surfactant contained.

As the above water repellent substances, known water repellency imparting agents and the like can be used. As the above water repellent substances, substances with water repellent substances dispersed in water medium are preferable since strength is enhanced due to the presence of water repellent substances finely in a molded non-calcined lead of a colored pencil, and from the viewpoint of water resistance, an O/W emulsion which does not contain a surfactant is more preferable, and further, in particular, using paraffin wax emulsion is the most suitable. For information, when an O/W emulsion which does not contain the above surfactant is mixed as a raw material, since only the above water repellent substances which are oily components remain as effective components after drying in production processes, moisture resistance of a color pencil lead and water resistance of a written mark can be enhanced.

The content of the above water repellent substance, in particular, an O/W emulsion which does not contain a surfactant, and above all, a paraffin wax emulsion is preferably contained in 0.1 to 5.0% by weight with respect to the total amount of the raw material composition (in solids) as effective components (water repellent component or wax component), and its optimum range is 1.5 to 4.5% by weight. When the content of water repellent substances is less than 0.1% by weight with respect to the total amount of the raw material composition (in solids), water resistance and moisture resistance lower and when the content exceeds 5.0% by weight, moldability, bending strength, and erasability with an eraser lower.

(Body Filler)

As a body filler, known body filler can be used, however, a body filler which does not inhibit coloring (brightness) and tinting strength is preferable. To be specific, talc, kaolin, calcium carbonate, alumina silicate, white mica, magnesium carbonate, silica, and the like can be exemplified. Then, among them, they can be used optionally selecting either alone or in combinations of two or more of them. For information, kaolin and white mica are the most suitable for a body filler. A body filler is contained in 60 to 80% by weight with respect to the total amount of the raw material composition (in solids), and preferably contained in 65 to 75% by weight. When the content of a body filler exceeds 80% by weight with respect to the total amount of the raw material composition (in solids), moldability of a lead lowers and when the content of a body filler is less than 60% by weight, writing performance lowers.

(Plate Type Alumina and/or Plate Type Alumina Hydrate)

A non-calcined lead of a colored pencil of the present invention can contain plate type alumina and/or plate type alumina hydrate as a part of or total of a body filler. By using plate type alumina and/or plate type alumina hydrate as a part of or total of a body filler instead of using talc, there occurs no concern of containing asbestos and there is no need for complex quality control operation unlike the case when talc is used. Therefore, a non-calcined lead of a colored pencil of the present invention is excellent in safety and in operation. Although the above plate type alumina and/or plate type alumina hydrate are not specifically limited, it is enough as far as a non-calcined lead of a colored pencil in which plate type alumina and/or plate type alumina hydrate are contained as a body filler shows the same or better bending strength and writing performance.

A non-calcined lead of a colored pencil in which plate type alumina and/or plate type alumina hydrate are contained as a body filler develops bending strength with plate type alumina and/or plate type alumina hydrate orienting in one direction in molding as in conventional talc, and therefore since operation for confirmation of absence of asbestos in a body filler is not required, quality control operation as a part of a production process of a non-calcined lead of a colored pencil is easy, and moreover, since there is no possibility of containing asbestos as in conventional talc, a non-calcined lead of a colored pencil with excellent safety can be obtained.

For information, by using plate type alumina and/or plate type alumina hydrate and a safe body filler other than talc together as a body filler which is contained in a non-calcined lead of a colored pencil, a non-calcined lead of a colored pencil of the present invention can be produced as a non-calcined lead of a colored pencil with safety.

In the above alumina and/or plate type alumina hydrate, particles in the powder may be either hexagonal plate types or circle plate types as long as they are substantially flat plate types, and those particles in the powder of alumina and/or plate type alumina hydrate need not have uniform shapes due to the grinding. The above alumina and/or plate type alumina hydrate are not specifically limited as polymorphism, and the above plate type alumina may be alone or in combinations of two or more of them selected from the group of $\alpha\text{-}Al_2O_3$, $\gamma\text{-}Al_2O_3$, and $\theta\text{-}Al_2O_3$ or they may be alone or in combinations of two or more of them selected from the group of $\alpha\text{-}Al_2O_3$ hydrate, $\gamma\text{-}Al_2O_3$ hydrate, and $\theta\text{-}Al_2O_3$ hydrate. However, it is preferable that plate type alumina is $\alpha\text{-}Al_2O_3$ and that plate type alumina hydrate is $\alpha\text{-}Al_2O_3$ hydrate since they have no pores on the surface, and comparatively large amount of plate type alumina can be used in the mixing of a non-calcined lead of a colored pencil without deteriorating strength and they are easy to disperse. Plate type alumina hydrate used may be plate type mono hydrate, plate type dehydrate, or plate type trihydrate. For information, when either γ-$Al_2O_3$ or θ-$Al_2O_3$ alone or in combinations thereof are used as a plate type alumina and when either γ-$Al_2O_3$ or θ-$Al_2O_3$ hydrate alone or in combinations thereof are used as a plate type alumina, they may be used directly. However, when the surface of plate type alumina and/or plate type alumina hydrate are treated with coupling agents including silane coupling agents or titanate coupling agents, they can preferably be used like α-$Al_2O_3$.

The production method of the above plate type alumina and/or plate type alumina hydrate is not specifically limited, and, for example, α-$Al_2O_3$ and α-$Al_2O_3$ hydrate can be obtained by regulating granularity of aluminum hydroxide obtained by Bayer process, followed by hydrothermal synthesis process (350° C. and higher, 200 atm and lower)using crystal inhibiting agents including $Na_2SiO_3$, and the like.

Although the particle diameter of the above plate type alumina and/or plate type alumina hydrate is not specifically limited, those with a diameter of 0.1 to 20 μm can preferably be used. In addition, although the aspect ratio of the above plate type alumina and/or plate type alumina hydrate is not specifically limited, powder of those with a mean value of 2 to 50 can preferably be used. Here, the aspect ratio is represented by dividing an average diameter of a particle (μm) by thickness (μm). To be specific, Serafu FYA00610, Serafu FYA02025, and Serafu 10030 (manufactured by YKK Corporation) and Therases BMN, Therasis BMN-B (manufactured by Kawai Lime KK) can be used as the above alumina and/or plate type alumina hydrate. The above alumina and/or plate type alumina hydrate can be used alone or in combinations. Alumina and/or plate type alumina hydrate are preferably contained in 2 to 85% by weight with respect to the total amount of the raw material of a non-calcined lead of a colored pencil in solids and are more preferably contained in 5 to 80% by weight. When alumina and/or plate type alumina hydrate are contained in excess of 85% by weight with respect to the total amount of the raw material of a non-calcined lead of a colored pencil in solids, coloring (brightness) lowers and therefore it is not preferable. On the other hand, when plate type alumina and/or plate type alumina hydrate are contained in less than 2% by weight with respect to the total amount of the raw material of a non-calcined lead of a colored pencil in solids, writing performance lowers when written, and tinting strength lowers, and formation of a lead becomes difficult, therefore it is not preferable.

For information, either of plate type alumina and/or plate type alumina hydrate may consist of one kind or it may consist of various kinds in different shapes, particle diameters, compositions or the like, or plate type alumina and plate type alumina hydrate may be a mixture in which various kinds are mixed.

(Other Components)

For information, in producing a non-calcined lead of a colored pencil, as required, other additives including antiseptic mildew proofing agents, lubricants, or the like can be used in addition to solvents including water and alcohol and the like for dissolving a water-soluble resin.

(Production Method)

Basically, in the production method of a non-calcined lead of a colored pencil in the present invention, each component described above are mixed, molded into specific shapes, thereby obtaining a non-calcined lead of a colored pencil of the present invention. For example, the raw materials are kneaded using kneading machines (kneader and the like), thereafter heating to the temperature of 60° C. for 4 hours, evaporating water in an appropriate manner. Next, the kneaded materials are preparatively formed using a pressurizing machine, followed by extruding into a molding to produce a pencil lead with a diameter of 3 mm with a plunger type molding machine by, thereafter drying (for 12 hours at the temperature of 70° C., for example), thereby preparing a non-calcined lead of a colored pencil of the present invention. A non-calcined lead of a colored pencil of the present invention can be obtained by further impregnating oils and waxes in this molding as required.

EXAMPLES

The present invention will be further detailed by way of the following examples and comparative examples thereof, but the present invention will not be limited by these examples.

A non-calcined lead of a colored pencil of Examples 1 to 9, Comparative Examples 1 and 2 was obtained by the following process using the raw materials and contents thereof shown in the Table 1. First, a colorant, a body filler, and a binder were kneaded with substantially the same amount of the solvent for about 8 hours at the temperature of 60° C. Subsequently, a mixture of a hydrophilic surfactant and waxes and/or oils that are oily substances were added thereto and further, as required, a water repellent substances were added. Next, after letting this through three rolls once without heating, thereafter degassing, it was molded preparatively with a plunger type molding machine, followed by extruding into a molding to produce a pencil lead with a diameter of 3 mm, thereafter drying for at least 12 hours at the temperature of 70° C., thereby preparing a non-calcined lead of a colored pencil of the present invention.

For information, the content of each raw material in Table 1 is represented by % by weight as in solids and water was used as a solvent.

TABLE 1

|  | Example | | | | | | | | | [% by weight] Comparative Example | |
|---|---|---|---|---|---|---|---|---|---|---|---|
|  | 1 | 2 | 3 | 4 | 5 | 6 | 7 | 8 | 9 | 1 | 2 |
| Raw material composition |  |  |  |  |  |  |  |  |  |  |  |
| Binder (a) | 8.0 | 8.0 | 8.0 | 8.0 | 8.0 | 8.0 | 8.0 | 8.0 | 8.0 | 8.0 | 8.0 |
| Body filler (a) | 67.0 | 67.0 | 67.0 | 67.0 | 67.0 | 69.5 | 59.5 | 58.0 | 60.5 | 72.5 | 70.0 |

TABLE 1-continued

| | Example | | | | | | | | | Comparative Example [% by weight] | |
|---|---|---|---|---|---|---|---|---|---|---|---|
| | 1 | 2 | 3 | 4 | 5 | 6 | 7 | 8 | 9 | 1 | 2 |
| Colorant (a) | 15.0 | 15.0 | 15.0 | 15.0 | 15.0 | 15.0 | 15.0 | 15.0 | 15.0 | 15.0 | 15.0 |
| Waxes and/or oils | 4.5 | 4.5 | 4.5 | 4.5 | 4.5 | 4.5 | 4.5 | 4.5 | 4.5 | 4.5 | 4.5 |
| Hydrophilic surfactant | | | | | | | | | | | |
| (a) | 3.0 | | | | 3.0 | 3.0 | 3.0 | 12.0 | 12.0 | | |
| (b) | | 3.0 | | | | | | | | | |
| (c) | | | 1.0 | | | | | | | | |
| (d) | | | | 2.7 | | | | | | | |
| Oleophilic surfactant | | | 2.0 | 0.3 | | | | | | | |
| Water repellent substance (as wax) | | | | | | | | | | | |
| (a) | 2.5 | 2.5 | 2.5 | 2.5 | | | 10.0 | 2.5 | | | 2.5 |
| (b) | | | | | 2.5 | | | | | | |
| Total | 100 | 100 | 100 | 100 | 100 | 100 | 100 | 100 | 100 | 100 | 100 |
| Physical properties | | | | | | | | | | | |
| Bending strength | | | | | | | | | | | |
| Value (MPa) | 21.5 | 20.3 | 19.1 | 18.5 | 19.7 | 23.8 | 15.8 | 13.5 | 14.9 | 9.4 | — |
| Evaluation | ◎ | ◎ | ◎ | ◎ | ◎ | ◎ | ○ | ○ | ○ | X | — |
| Moldability | ◎ | ◎ | ○ | ○ | ◎ | ◎ | ◎ | ◎ | ◎ | X | X |
| Bending strength after preservation with 80% moisture (MPa) | 20.2 | 19.4 | 18.6 | 18.4 | 18.3 | 9.7 | 15.4 | 5.1 | — | — | — |
| Tinting strength | | | | | | | | | | | |
| Value (m/25 m) | 23.4 | 24.3 | 26.6 | 26.8 | 25.8 | 19.6 | 32.8 | 35.4 | 29.6 | — | — |
| Evaluation | ○ | ○ | ○ | ○ | ○ | ○ | ○ | ○ | ○ | — | — |
| Erasibility | ◎ | ◎ | ◎ | ◎ | ◎ | ○ | X | ○ | ○ | X | X |

A non-calcined lead of a colored pencil of Examples 10 to 13, Comparative Examples 3 to 6 was obtained by the following process using the raw materials and contents thereof shown in the Table 2. First, plate type alumina, plate type alumina hydrate, a colorant, and a binder were kneaded using a kneader with substantially the same amount of the solvent for about 4 hours at the temperature of 60° C., followed by adding and kneading a mixture of a hydrophilic surfactant and waxes and/or oils that are oily substances prepared in advance, further adding a water repellent substances thereafter kneading.

For information, the content of each raw material in Table 2 is represented by % by weight as in solids and water was used as a solvent.

TABLE 2

| | Example | | | | Comparative Example [% by weight] | | | |
|---|---|---|---|---|---|---|---|---|
| | 10 | 11 | 12 | 13 | 3 | 4 | 5 | 6 |
| Raw material composition | | | | | | | | |
| Binder (b) | 8.0 | 8.0 | 8.0 | 8.0 | 8.0 | 8.0 | 8.0 | 8.0 |
| Plate type alumina | 35.1 | | 70.1 | 14.0 | | 4.2 | | |
| Plate type alumina hydrate | | 56.1 | | | | | | |
| Body filler (a) | | | | | | 70.1 | 70.1 | |
| Plate filler (b) | 35.1 | 14.0 | | 56.1 | 70.1 | | | 70.1 |
| Lubricant (a) | 4.2 | 4.2 | 4.2 | 4.2 | 4.2 | | 4.2 | |
| Lubricant (b) | | | | | | | | 4.2 |
| Colorant (b) | 6.7 | 6.7 | 6.7 | 6.7 | 6.7 | 6.7 | 6.7 | 6.7 |
| Oils and/or waxes | 4.5 | 4.5 | 4.5 | 4.5 | 4.5 | 4.5 | 4.5 | 4.5 |
| Hydrophilic surfactants (c) | 2.9 | 2.9 | 2.9 | 2.9 | 2.9 | 2.9 | 2.9 | 2.9 |
| Water repellent substance (c) | 3.6 | 3.6 | 3.6 | 3.6 | 3.6 | 3.6 | 3.6 | 3.6 |
| Total | 100.0 | 100.0 | 100.0 | 100.0 | 100.0 | 100.0 | 100.0 | 100.0 |
| Physical properties | | | | | | | | |
| Bending strength | | | | | | | | |
| Value (MPa) | 30.5 | 28.0 | 23.2 | 32.8 | 39.6 | 20.0 | 12.8 | 20.5 |
| Evaluation | ○ | ○ | ○ | ◎ | ◎ | ○ | X | ○ |
| Moldability | ○ | ○ | ○ | ○ | ○ | ○ | ○ | ○ |
| Bending strength after preservation with 80% moisture (MPa) | 28.7 | 26.3 | 21.9 | 30.8 | 37.2 | 18.8 | 14.9 | 19.3 |
| Writing perfor- | ○ | ◎ | ◎ | ○ | X | ◎ | ◎ | Δ |

TABLE 2-continued

| | [% by weight] | | | | | | |
|---|---|---|---|---|---|---|---|
| | Example | | | | Comparative Example | | |
| | 10 | 11 | 12 | 13 | 3 | 4 | 5 | 6 |
| mance Tinting strength | | | | | | | | |
| Value (mg/25 m) | 13.0 | 15.3 | 18.2 | 10.0 | 4.1 | 16.8 | 17.0 | 13.8 |
| Evaluation | ○ | ○ | ○ | Δ | X | ○ | ○ | ○ |
| Erasability | ○ | ◎ | ◎ | ○ | Δ | ◎ | ◎ | ◎ |

For information, in Tables 1 and 2, each component is as follows.

Binder
(a): Hydroxyethyl cellulose (trade name "Tylose H 20P2", manufactured by Clariant Polymers KK)
(b): Polyvinyl alcohol (trade name "KURARAY Poval", manufactured by KURARAY CO., LTD)

Body Filler
(a): Pigment White 26 (trade name "MICRO ACE P-4", manufactured by NIPPON TALC CO., LTD)
(b): Kaolin (trade name "KAOBRIGHT", manufactured by TSUCHIYA KAOLIN KK)

Colorant
(a): Watching Red Sr (trade name "Red SR-200PH", manufactured by NOMA KAGAKUKOGYO KK)
(b): Phthalo cyanine blue (tradename "HOSTAPERM BLUE B2G", manufactured by Clariant Japan) and titanium oxide (trade name "Tipure R 900", manufactured by Dupont KK)

Waxes and/or oils: liquid paraffin (trade name "ONDINA OIL", manufactured by Showa Shell Sekiyu KK)

Hydrophilic Surfactant
(a): Polyoxyethylene castor oil (trade name "Emulsogen EL", manufactured by Clariant Japan, number of additional moles of ethylene oxide chain: n=36 mol)
(b): Polyoxyethylene hardened castor oil (trade name "HCO-20", manufactured by Nikko Chemicals Co., Ltd, number of additional moles of ethylene oxide chain: n=20 mol)
(c): Monooleic acid polyoxyethylene sorbitan(trade name "TO-10", manufactured by Nikko Chemicals Co.,Ltd, number of additional moles of ethylene oxide chain: n=20 mol)
(d): Monooleic acid decaglyceryl (tradename"Decaglyn 1-O", manufactured by Nikko Chemicals Co.,Ltd)

Oleophilic surfactant: Sesqui oleic acid sorbitan (trade name "SO-15", manufactured by Nikko Chemicals Co.,Ltd)

Water Repellent Substances
(a): Paraffin wax emulsion (trade name "Pekophob 1160", manufactured by Dick Peters BV Co., Ltd)
(b): Paraffin wax emulsion(trade name "E701K", manufactured by Clariant Japan Co., Ltd)
(c): Paraffin wax emulsion(trade name "Pekophob", manufactured by Dick Peters BV Co., Ltd)

Lubricant
(a): Boron nitride
(b): Mica (trade name "MICA POWDER A-11", manufactured by Yamaguchi Unmo Kogyosho KK)

(Evaluation)

Erasability with an eraser, bending strength (Mpa) after preservation with 80% moisture, tinting amount (mg/25 m), and moldability were evaluated respectively on a non-calcined lead of a colored pencil in the Examples and Comparative Examples shown in Table 1.

(Bending Strength)

Bending strength was evaluated based on the JIS-S-6005. That is, a load is applied to a central part of a colored pencil lead supported between both of the supporting points and the load was measured at the time of a lead breakage, substituting the formula specified by JIS examination method. The result figure was evaluated based on the following criteria; ◎ as having higher bending strength than a conventional non-calcined lead of a colored pencil, ○ as having substantially the same bending strength as conventional a non-calcined lead of a colored pencil, X as having lower bending strength than a conventional non-calcined lead of a colored pencil and cannot be used.

(Bending Strength After Preservation with 80% Moisture)

This bending strength after preservation with 80% moisture was measured and evaluated as in the above bending strength test after preservation 6 hours under the 80% moisture.

(Tinting Strength)

A tinting strength amount was obtained by calculating the difference between the weight of a lead after written 25 m and that of a lead before written. The result figure was evaluated based on the following criteria; ○ as having more superior tinting strength amount to a conventionally used non-calcined lead of a colored pencil, Δ as having substantially the same tinting strength amount as a conventionally used non-calcined lead of a colored pencil, X as having inferior tinting strength amount to a conventionally used non-calcined lead of a colored pencil.

(Moldability)

The result was shown based on the criteria of X as not less than 40% of the molded leads were broken to pieces, Δ as less than 40% and not less than 35% of leads were broken, ○ as less than 35% and not less than 30% of leads were broken, and ◎ as less than 35% of leads were broken during the time of molding or drying.

(Erasability with an Eraser)

The erasability with an eraser was evaluated by writing on the drawing paper using each of colored pencils prepared in Examples and Comparative Examples. The eraser used in this test was that available from Rabbit Co., LTD. under the trade name of "RC-60". The erasability with an eraser was evaluated on the following criteria; ◎: The erasability with an eraser was excellent,○: The erasability with an eraser was good, Δ: The erasability with an eraser was not very good, and X: the erasability with an eraser was not good.

(Writing Performance)

Sensory evaluation was conducted on writing performance using a colored pencil lead whose Example and Comparative Example numbers were concealed. To be specific, colored pencils using non-calcined leads of colored pencils in Examples and Comparative Examples were produced and the evaluation based on the sensory feeling of 10 monitors when they wrote on a drawing paper under the condition of the temperature of 20° C. and both with 65% and 85% moisture. The result was shown based on the criteria; ◎ as 10 out of 10 monitors judged the writing performance was good, ○ as 8 to 9 out of 10 monitors judged the writing performance was good, Δ as not more than 7 and not less than 5 out of 10 monitors judged the writing performance was good,and X as not more than 4 out of 10 monitors judged the writing performance was good.

From Table 1, non-calcined leads of colored pencils of Examples 1, 2, and 5 to 9 using non-calcined leads of colored pencils which contain polyoxyethylene additives of oils as surfactants had better bending strength and moldability with more than just usable compared with non-calcined leads of colored pencils of Comparative Examples 1 and 2 which do not contain hydrophilic surfactants. In addition, compared with non-calcined leads of colored pencils of Examples 3 and 4 which contain sorbitan fatty acid ester surfactants, non-calcined leads of colored pencils of Examples 1, 2 and 6 had improved bending strength and moldability of a lead, and non-calcined leads of colored pencils of Examples 5 and 7 had improved only moldability depending on the kinds and content of water repellent substances, and further, non-calcined leads of colored pencils of Examples 8 and 9 had improved only moldability due to the fact that they contained a large amount of hydrophilic surfactant.

Non-calcined leads of colored pencils of Examples 1 to 5 which contain water repellent substances together with hydrophilic surfactant, maintained the ordinary bending strength in a preferable manner, while preventing the lowering in bending strength after preservation with 80% moisture, and further, erasability with an eraser, tinting strength, and moldability are preferable, thereby capable of obtaining the well balanced properties as non-calcined leads of colored pencils erasable with an eraser. On the other hand, since a non-calcined lead of a colored pencil of Example 6 contains hydrophilic surfactants and does not contain water repellent substances, it was judged that moisture resistant property of a lead and that of a written mark lowered since bending strength after preservation with 80% moisture lowered although bending strength improved.

For information, although a non-calcined lead of a colored pencil in Example 8 is a non-calcined lead of a colored pencil which contains polyoxyethylene additives of oils as hydrophilic surfactants, since a hydrophilic surfactant is contained more than 10.0% by weight with respect to the total amount of the raw material composition in solids, hydrophilic property is too strong that water resistant property lowers, however, compared to a non-calcined lead of a colored pencil in Example 9, water resistant property improves to the level where tests are applicable to bending strength after the preservation with 80% moisture.

Further, although it isn't shown in Table 1, in a non-calcined lead of a colored pencil in which polyoxyethylene additives of oils are contained in less than 0.1% by weight with respect to the total amount of the raw material composition in solids, since the content is so little that the obtained result was not so different from a non-calcined lead of a colored pencil in Comparative Example 1 and in the case of a non-calcined lead of a colored pencil which contains oily substances in liquids at an ordinary temperature, moldability of a lead becomes difficult and even when it is molded, bending strength of the said lead is low and the usability lowered.

Further, even in the case of a non-calcined lead of a colored pencil in which O/W emulsion which does not contain a surfactant, in particular, in which a paraffin wax emulsion is mixed, in Comparative Example 4 in which the effective component (water repellent component or wax component) was mixed greater than 5.0% by weight with respect to the total amount of the raw material composition in solids, moldability of a lead becomes difficult and even when it is molded, bending strength and erasability with an eraser lowers.

On the other hand, when a water repellent substance is contained in less than 0.1% by weight with respect to the total amount of the raw material composition in solids, water resistant property and moisture resistant property lowered. For information, in Comparative Example 2, in which only a water repellent substances were mixed without mixing hydrophilic substances, molding of a lead was impossible and preparing colored pencils itself was difficult. For information, "-" in the property column of Table 1 shows that the measurement of numerical values or evaluation thereof was not available.

A non-calcined lead of a colored pencil in Examples 10 to 13 had the same or better bending strength compared to a non-calcined lead of a colored pencil using talc (Comparative Examples 4 to 6) and erasability with an eraser were also good. In particular, a non-calcined lead of a colored pencil in Examples 10 to 13 had good tinting strength as well as bending strength, writing performance, moldability and erasability.

INDUSTRIAL APPLICABILITY

As mentioned above, since the present invention relates to a non-calcined lead of a colored pencil which contains a colorant, a binder, a body filler, waxes and/or oils, and a hydrophilic surfactant, and contains a polyoxyethylene additive of oils as the above hydrophilic surfactant, moldability and bending strength of a lead are good even when oily substances which are in liquids at an ordinary temperature are contained as waxes and/or oils. In addition, in the case of a non-calcined lead of a colored pencil which also contains water repellent substances in addition to a colorant, a binder, a body filler, waxes and/or oils, and a hydrophilic surfactant, moisture resistance of a lead and water resistance of a written mark can be improved.

Further, since the present invention relates to a non-calcined lead of a colored pencil which contains plate type alumina and/or a plate type alumina hydrate, it does not contain asbestos, therefore, it is excellent in safety. In addition, when compared with a non-calcined lead of a colored pencil which contains conventional talc as a body filler, a non-calcined lead of a colored pencil which contains plate type alumina and/or a plate type alumina hydrate has equivalent tinting amount (tinting strength) and bending strength, yet lowering of physical property is not observed with good writing performance. Therefore, a non-calcined lead of a colored pencil with excellence in safety and usability can be provided.

What is claimed is:

1. A non-calcined lead of a colored pencil comprising a colorant, a binder, a body filler, waxes and/or oils, and a hydrophilic surfactant, wherein a polyoxyethylene additive of oils composed of fatty acid ester and glycerine ester is contained as said hydrophilic surfactant.

2. A non-calcined lead of a colored pencil as a set forth in claim 1, wherein the waxes and/or oils are oily substances in liquids at an ordinary temperature.

3. A non-calcined lead of a colored pencil as set forth in claim 1, wherein the polyoxyethylene additive of oils contains at least either of polyoxyethylene castor oil or polyoxyethylene hardened caster oil.

4. A non-calcined lead of a colored pencil as set forth in claim 1, wherein the polyoxyethlene additive of oils is contained in 0.1 to 10.0% by weight with respect to the total amount of the raw material composition in solids.

5. A non-calcined lead of a colored pencil comprising a colorant, a binder, a body filler, waxes and/or oils, and a hydrophilic surfactant, further comprising a water repellent substance.

6. A non-calcined lead of a colored pencil as set further in claim 5, wherein the water repellent substance is a water repellency imparting agent with a water repellent substance dispersed in water medium.

7. A non-calcined lead of a colored pencil as set further in claim 5, wherein the water repellent substance is an O/W emulsion which dos not contain a surfactant.

8. A non-calcined lead of a colored pencil as set forth in claim 7, wherein the O/W emulsion which does not contain surfactant is a paraffin wax emulsion.

9. A non-calcined lead of a colored pencil as set forth in claim 5, wherein the water repellent substance is contained in 0.1 to 5.0% by weight with respect to the total amount of the raw material composition in solids.

10. A non-calcined lead of a colored pencil as set further in claim 5, wherein the hydrophilic surfactant comprises polyoxyethylene additive of oils in an amount of 0.1 to 10.0% by weight with respect to the total amount of the raw material composition in solids.

11. A non-calcined lead of a colored pencil comprising a plate alumina and/or a plate alumina hydrate as a body filler.

12. A non-calcined lead of a colored pencil as set forth in claim 11, wherein said plate alumina is selected at least one species from the group consisting of $\alpha$-$Al_2O_3$, $\gamma$-$Al_2O_3$, $\theta$-$Al_2O_3$, and said plate alumina hydrate is selected at least one species from the group consisting of $\alpha$-$Al_2O_3$ hydrate, $\gamma$-$Al_2O_3$ hydrate, and $\theta$-$Al_2O_3$ hydrate.

13. A non-calcined lead of a colored pencil as set forth in claim 11, wherein the plate alumina and/or a plate alumina hydrate are/is contained in 2 to 85% by weight with respect to the total amount of the non-calcined lead of a colored pencil.

* * * * *